UNITED STATES PATENT OFFICE.

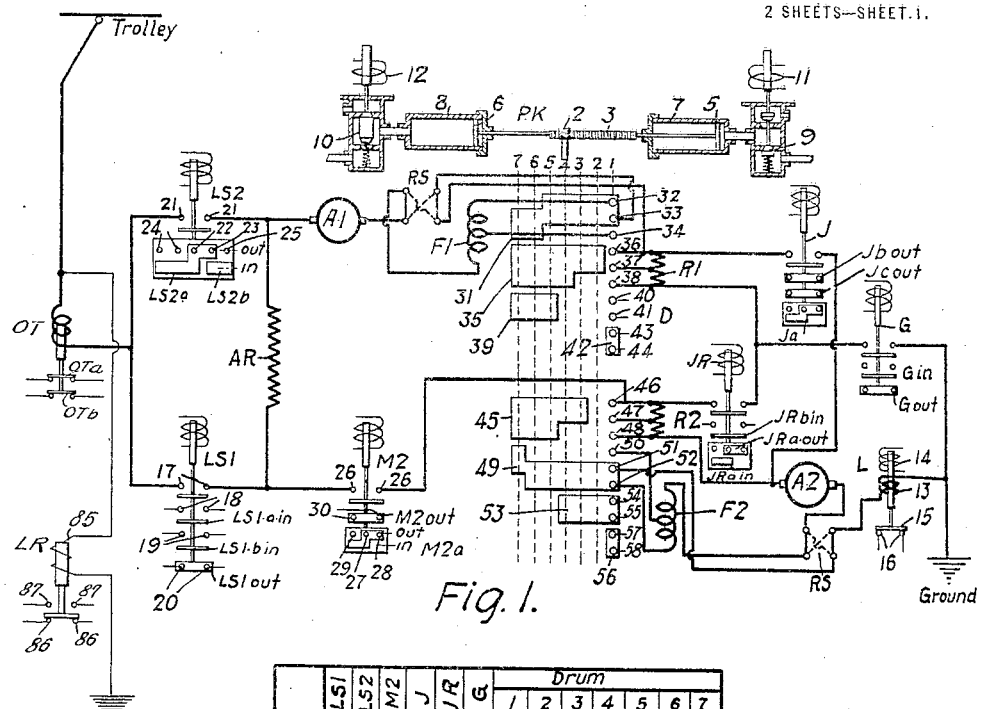

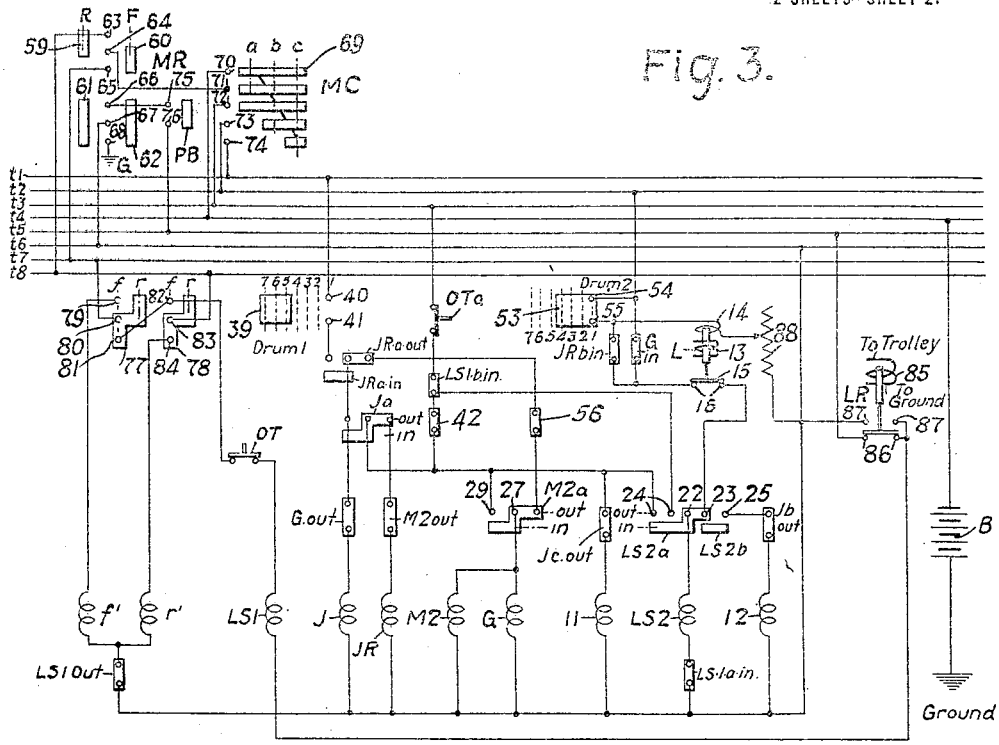

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,293,930. Specification of Letters Patent. Patented Feb. 11, 1919.

Application filed March 4, 1916. Serial No. 82,086.

*To all whom it may concern:*

Be it known that I, LYNN G. RILEY, a citizen of the United States, and a resident of Wilkinsburg, in the county of Allegheny and State of Pennsylvania, have invented a new and useful Improvement in Systems of Control, of which the following is a specification.

My invention relates to systems of control and particularly to the automatic series-parallel control of electric railway vehicle motors.

One of the objects of my invention is to provide a relatively simple and reliable system of the above-indicated character for preventing undesirable rushes of current and too sudden acceleration of the vehicle during a predetermined portion of its accelerating period.

Another object of my invention is to provide a system of the above-indicated class that shall eliminate any false operation of the unit switches employed therein, in case the motors of a plurality of railway vehicles may be connected to the system.

Another object of my invention is to provide a system of the above-indicated class with means that shall prevent acceleration of the motors therein unless certain unit switches for connecting the motors in series or in parallel-circuit relation, be operated.

A further object of my invention is to provide a system with two line switches, one of which shall be under the control of the supply circuit of the system and control all the operated unit switches, so that the line switch will release all operated unit switches in case the supply circuit be broken, the other line switch having means for effecting a holding circuit through any unit switch that may be operated.

This application is an improvement of my application Serial No. 23,415, filed April 23, 1915. In my former application referred to, the line relay is associated with all switches employed in the system in order to release the switches in case the supply circuit be broken, but neither one of the line switches is provided with means for establishing a holding circuit for the switches of the system as they are operated and no special means is provided to prevent the accelerating of the motors in series or in parallel-circuit relation in case the switch connecting the motors in series or the switch for grounding one of the motors fails to operate.

However, in my present system, one line relay is provided which releases a line switch in case the supply circuit is broken, the line switch in turn releasing all switches that may be operated. A second line switch is provided with interlock switches attached thereto for establishing holding circuits through the switches of the system as they are operated. Special interlock switches are provided on the unit switch for placing the motors of the system in series and on the unit switch for grounding the first motor when the motors are operated in parallel relation, whereby the acceleration of the motors in series or in parallel-circuit relation is prevented until one of the above switches be operated.

In the accompanying drawings illustrating my invention, Figure 1 is a diagrammatic view of the main circuits in a system constructed in accordance with my invention; Fig. 2 is a sequence chart for indicating the sequence of operation of the various switching devices that are illustrated in Fig. 1; Fig. 3 is a diagrammatic view of the auxiliary control circuits of the system disclosed in Fig. 1, and Figs. 4 to 8, inclusive, are diagrammatic views of the motor circuits completed in the various positions of the controller illustrated in Fig. 1.

Referring to Fig. 1 of the drawings, the system here shown comprises a pair of suitable supply-circuit conductors respectively marked Trolley and Ground; a plurality of electric motors respectively having armatures A1 and A2 and subdivided field windings F1 and F2 to permit of field control of the motors; a reversing switch RS preferably of the familiar electrically-controlled drum type for simultaneously reversing the electrical relations of the respective armatures and field windings; a plurality of motor-controlling switches LS1, LS2, M2, JR, J and G of a familiar electrically-controlled type; a mechanically-actuated switching apparatus PK, preferably of the drum type, that is employed in connection with a plurality of accelerating resistors R1, R2 and also for varying the active amounts of the field windings during acceleration; and another accelerating resistor AR that is adapted to be short-circuited by the closure of the switches LS1 and LS2. The system is also provided with a limit switch L that is connected in circuit in a manner to be described, and an overload trip switch OT of a familiar type.

The apparatus PK is adapted to assume a plurality of operating positions 1 to 7, inclusive, and comprises a control drum D that is provided with a shaft 1 upon which is mounted a pinion 2 that is adapted to mesh with a suitable rack member 3. Suitable pistons 5 and 6 are respectively secured to the ends of the rack member 3 and are disposed to operate within suitable cylinders 7 and 8, respectively. A suitable valve member 9 is adapted, when actuated, to admit fluid pressure from any suitable source (not shown) to the cylinder 7, and a second valve member 10 is normally adapted to admit fluid pressure to the cylinder 8. The valve members 9 and 10 are also adapted to be electrically controlled through the agency of suitable coils 11 and 12, respectively, that are connected in the auxiliary control system shown in Fig. 3, as hereinafter set forth.

The operation of the apparatus PK may be described as follows. In the position shown in the drawing, with both the magnet coils 11 and 12 deënergized, fluid pressure is admitted through the valve member 10 to the cylinder 8 to bias the piston 6 and the drum D to the position shown in the drawings, which corresponds to the off position of the master controller that is illustrated in Fig. 3. To effect movement of the drum D, the magnet coils 11 and 12 are energized, whereupon fluid pressure is admitted through the valve member 9 to the cylinder 7 and is exhausted from the cylinder 8 through the valve member 10, thereby rotating control drum through its successive operative positions. The general arrangement of the parts, including the size of the valve openings and the customary drum star-wheel device (not shown) is such that the apparatus PK is adapted to stop only in its definite positions 1 to 7, inclusive, as will be understood. To arrest the movement of the drum in any position, it is merely necessary to deënergize the magnet coil 12, whereupon the valve opens to admit fluid pressure to the cylinder 8 and to balance the pressure in the cylinder 7, thereby maintaining the control drum D in the desired position until the magnet coil 12 is again energized. Where the magnet coil 12 is intermittently energized through the agency of the limit switch L, in accordance with the value of the accelerating current, as set forth, the control drum is given a step-by-step movement to gradually exclude from circuit the resistors R1 and R2 and to subsequently vary the active amounts of the field windings F1 and F2. To return the control drum D to the first position shown in the drawings, it is merely necessary to deënergize both magnet coils 11 and 12, whereupon fluid pressure is admitted to the cylinder 8 and is exhausted from the cylinder 7.

The limit switch L is provided with the customary series coil 13 that is here connected in series circuit with the armature A2 and is also provided with an auxiliary shunt-conected, differentially-wound coil 14 that is energized in the manner to be described in connection with the system shown in Fig. 3. The usual auxiliary contact member 15, for bridging contact terminals 16 and for opening and closing circuits of the auxiliary governing system, is also associated with the limit switch.

The line switch LS1 is adapted to bridge contact terminals 17, when operated, and is provided with interlock switches LS1a—in and LS1b—in which are adapted to engage contact terminals 18 and 19, respectively, when the relay is operated and an interlock switch LS1—out which is adapted to engage contact terminals 20 when the relay is released. The line switch LS2 is adapted to bridge contact terminals 21, when operated, and is provided with an interlock switch LS2a which is adapted to engage contact terminals 22 and 23 when the relay is released and to engage contact terminals 24 when the relay is operated and with an interlock switch LS2b which is adapted to engage contact terminals 23 and 25 when the relay is operated. The unit switch M2 is adapted to engage contact terminals 26 when the relay is operated and is provided with an interlock switch M2a which is adapted to bridge contact terminals 27 and 28 when the relay is deënergized and contact terminals 27 and 29 when the relay is operated, and an interlock switch M2—out which is adapted to engage contact terminals 30. The unit switch JR is provided with interlock switches JRb—in, JRa—out and JRa—in. The unit switch J is provided with interlock switches Jb—out, Jc—out and Ja. The unit switch G is provided with interlock switches G—in and G—out.

The control drum D embodies a contact segment 31 which is adapted to engage contact fingers 32, 33 and 34, a contact segment 35 which is adapted to engage contact fingers 36, 37 and 38, a contact segment 39 which is adapted to engage contact fingers 40 and 41, a contact segment 42 which is adapted to engage contact fingers 43 and 44, a contact segment 45 which is adapted to engage contact fingers 46, 47 and 48, a contact segment 49 which is adapted to engage contact fingers 50, 51 and 52, a contact segment 53 which is adapted to engage contact fingers 54 and 55 and a contact segment 56 which is adapted to engage contact-fingers 57 and 58.

The master reverser MR embodies contact segments 59, 60, 61 and 62 which are adapted to engage contact fingers 63, 64, 65, 66, 67 and 68 when moved to forward and reverse positions. The master controller MC embodies a contact segment 69 which is adapted to engage contact fingers 70, 71, 72, 73 and 74 when moved to positions $a$, $b$ and $c$. The master reverser is connected to the coils $f'$ and $r'$ which operate the reversing segments 77 and 78 to respectively engage contact fingers 79, 80 and 81, and 82, 83 and 84. A push-button PB is provided to engage contact terminals 75 and 76 for a purpose to be explained later.

The general operation of the system, so far as the main circuits of Fig. 1 are concerned and without regard to the particular auxiliary governing system illustrated in Fig. 3, may be set forth as follows: Energy is first supplied from the trolley conductor through the line switch LS1, accelerating resistor AR, the armature A1, suitable contact members of the reversing switch RS, the full field winding F1, contact fingers 32 and 33 that are bridged by the contact segment 31 of the drum controller D, other contact members of the reversing switch RS, the accelerating resistor R1, the switch JR, the accelerating resistor R2, the armature A2, other contact members of the reversing switch RS, the full field winding F2, contact fingers 52 and 51 that are bridged by the contact segment 49 of the control drum D, again through the reversing switch RS, and the actuating coil 13 of the limit switch L to the negative conductor. With the unit switches and the controller drum D in the positions above described, a circuit is completed through the two motors, as is illustrated in Fig. 4 of the drawings.

As indicated by the sequence chart of Fig. 2, the line switch LS2 is closed to short-circuit the accelerating resistor AR, and the apparatus PK is then moved in the step-by-step manner hereinbefore described to gradually short-circuit the resistors R1 and R2. In position 2 of the control drum, the contact segment 35 engages contact fingers 36 and 37 to short circuit one section of the resistor R1. In position 3, the contact segment 45 bridges contact fingers 46 and 47 to exclude a portion of the resistor R2 from the circuit. In position 4, the control finger 38 engages the contact segment 31 to complete the short-circuit of the resistor R1 while, in position 5, the control finger 48 engages the contact segment 45 to complete the exclusion from circuit of the resistor R2. With the control drum D in position 5 and the motors in series, as set forth, a circuit is completed as illustrated in Fig. 5 of the drawings.

The transition of the motors from series to parallel relation is then effected by the initial closure of the switch J. A subsequent opening of the switch JR and the return of the drum D to its initial position 1 and the final closure of the switches M2 and G are accompanied by the opening of the switch J, as hereinafter set forth in detail in connection with Fig. 2. The apparatus PK is then actuated through its first five positions in a manner similar to that already described.

When the drum D is actuated to position 6, contact finger 34, engages contact segment 31, and control finger 32 is disengaged from the contact segment 31, whereby a predetermined portion of field winding F1 is excluded from circuit to produce further acceleration of the corresponding motor in accordance with familiar practice. As soon as the control drum D occupies its final position 7, the contact finger 50 engages the contact segment 49 of the drum D while contact finger 52 breaks contact with the contact segment 49, thereby reducing the full field-winding to normal field-winding connection in the other motor in the same manner as that described in connection with field winding F1. With the controller D in position 7, a circuit is completed through the two motors as illustrated in Fig. 8 of the drawings.

It will be observed that the resistors R1 and R2 are gradually excluded from circuit in corresponding successive steps and that the active amounts of the field windings F1 and F2 are also varied successively and controllably in accordance with the value of their accelerating currents, thereby preventing an undesirable rush of current and providing a relatively smooth acceleration during this portion of the motor operation.

The master controller MC is adapted to assume a plurality of operative positions $a$, $b$ and $c$, respectively corresponding to initial series, full series and full parallel relation of the motors. However, the system shown being automatic, the controller may be directly thrown to its final position $c$, as will be understood. The master reverser MR is adapted to assume the customary forward, off and reverse positions.

The line relay LR is shown as provided with an actuating coil 85 the respective ends of which are adapted to be connected to the supply-circuit conductors Trolley and Ground, as shown in Fig. 1. The switch is adapted to occupy a lower position to bridge contact terminals 86 for completing certain auxiliary circuits when the coil 85 is deënergized and to occupy an upper position to bridge contact terminals 87 for completing other auxiliary circuits when the coil 85 is energized, as hereinafter more fully set forth.

The shunt coil 14 of the limit switch L is shown as energized from the battery B through the master controller and the contact segment 53 of the controller drum D, and its energizing effect upon the limit switch opposes the action of the series coil 13 and may be varied in accordance with predetermined conditions by means of a suitable variable resistor 88. The particular means for varying the resistor 88 of this device, however, forms no essential part of my present invention and is fully shown and described in a copending application of Francis H. Shepard, Serial No. 785, filed January 6, 1915, and assigned to the Westinghouse Electric and Manufacturing Company.

Assuming the master reverser MR to be moved to its forward position and the master controller MC to be actuated to its final running position c, the automatic operation of the auxiliary control system may be described as follows. A circuit is first completed from the ground through battery B, train-line 14, contact finger 70, contact segment 69 of the master controller MC, contact finger 71, contact finger 64, control segment 60 of the master reverser MR, contact finger 65, train-line conductor t7, contact fingers 80 and 81, contact segment 88, contact finger 82, overload trip switch OT, coil of the line switch LS1, contact terminals 87 which are bridged by the line relay, train-line conductor t6, contact finger 67, contact segment 62 and contact finger 68 to the ground G. The line switch LS1 is operated and a second circuit completed from the contact segment 69 of the master controller which may be traced through contact finger 72, train-line conductor t3, overload trip switch OTa, interlock switch LS1b—in, interlock switch 42, interlock switch Ja—out, interlock switch M2—out, coil of the unit switch JR, train line conductor t6 and the contact fingers 67 and 68, which are bridged by the control segment 62, to ground G. The switches LS1 and JR are now operated, and a motor circuit is completed as has been hereinbefore described and as is illustrated in Fig. 4 of the drawings. The coil 11, being disposed in parallel with the coil of switch JR, is energized simultaneously with it.

Another circuit is completed from the control segment 69 of the master controller MC through contact finger 73, train-line conductor t2, contact fingers 54 and 55 which are bridged by the contact segment 53, interlock switch JRb—in, contact terminals 16 which are bridged by the limit switch L, contact terminals 22 and 23 which are bridged by the interlock switch LS2a, coil of the unit switch LS2, interlock switch LS1a—in, train line conductor t6, contact finger 67, control segment 62 and contact finger 68 to ground G. The line switch LS2 is operated and the resistor AR excluded from the circuit of the motors.

The line switch LS2 operates the interlock switch LS2a to bridge contact terminals 24 and establish a holding circuit from the train-line conductor t3 through overload switch OTa, interlock switch LS1b—in, contact terminals 24 bridged by the interlock switch LS2a, interlock switch Ja, coil of the unit switch JR and the master reverser MR to ground. Each of the unit switches 11, G, M2 and J is provided with a holding circuit by the interlock switch LS2a whenever the same is operated.

The unit switch LS2 completes a further circuit by means of the interlock switch LS2b which may be traced from the train-line t2, contact fingers 54 and 55 bridged by the contact segment 53, interlock JRb—in, contact terminals 16 bridged by the limit switch L, contact terminals 23 and 25 bridged by the interlock switch LS2b, interlock Jb—out, coil 12, the train-line conductor t6 and the master reverser MR to ground. The coil 12 is energized and the valve 10 operated to rotate the controller drum D in the manner above described.

The two magnet coils 11 and 12 of the apparatus PK being thus energized, the control drum D will move forward in a step-by-step manner in accordance with the position of the limit switch L to gradually effect the short-circuiting of the resistors R1 and R2, as hereinbefore described, and to effect a motor circuit as illustrated in Fig. 5.

After the drum leaves position 4, the contact segment 53 of the drum breaks the connection between the contact fingers 54 and 55, thus deënergizing the magnet coil 12 of the drum irrespective of the position of the limit switch L. In this way, the drum is prevented from passing beyond position 5 while the interlock JRb—in occupies its in-position, or, in other words, while the motors are connected in series relation.

As soon as the apparatus PK has reached its final resistor-short-circuiting position 5, another circuit is established from the contact segment 69 of the master controller MC through contact finger 74, train-line t1, contact fingers 40 and 41 which are bridged by the controller segment 39, interlock switch JRa—in, interlock G—out, coil of the unit switch J, train line t6 and the master reverser MR to the ground G.

The switch J is closed, the switch JR is opened by reason of the exclusion from its control circuit of the interlock switch Ja, and the magnet coil 11 of the apparatus PK is simultaneously deënergized by reason of the exclusion from its control circuit of the interlock Jc—out. The magnet coil 12 being deënergized as already pointed out, control drum D is returned to its initial position 1 by reason of the concurrent deënergization of the magnet coils 11 and 12, as hereinbefore explained.

A circuit is completed from contact segment 69 through controller finger 72, train-line conductor 63, overload trip switch OT$a$, interlock switch LS1$b$—in, contact terminals 24 which are bridged by the interlock switch LS2$a$, interlock J$a$—in, interlock JR$a$—out, interlock switch 56, interlock switch M2$a$—out, coils of the switches M2, G and train-line $t$6 through master reverser MR to the ground G. The unit switches M2 and G are operated, the circuits of the unit switches J and JR are broken by the interlock switches G—out and M2—out and a holding circuit for the coils of the switches G and M2 is established by reason of the interlock switch M2$a$—in engaging contact terminals 27 and 29.

Whereas, in the usual type of bridging series-parallel control, the J switch is closed in accordance with the position of a limit switch after the various accelerating resistors have been completely short-circuited, and the initial short-circuits of the resistors are thereafter removed to render them adaptable for subsequent service in initial connection with the parallel operation of the motors, and the switches M2 and G are finally brought in to complete the initial parallel connection of the motors, it will be observed that, as soon as the accelerating resistors have been initially completely short-circuited in the bridging transition just described, the J switch closes a second short-circuit around the resistors R1 and R2, irrespective of the limit switch L. The control drum D is returned to its initial position 1 to remove the initial short-circuits from the resistors R1 and R2, while the limit switch L is being held in its upper position by the flow of current incident to the final short-circuit of the accelerating resistors.

As soon as the switch J has been opened, by reason of the exclusion from its control circuit of the interlock switch G—out on the closure of the switch G, the energizing circuit of the actuating coil 11 of the apparatus PK is completed in a manner similar to that already described, and the magnet coil 12 is energized by a circuit which may be traced from the train-line $t$2, through interlock G—in, limit switch L, interlock LS2$b$, interlock switch J$b$—out, coil 12, train-conductor $t$6 and the master reverser MR to ground G. The apparatus moves forward through its successive positions in the step-by-step manner set forth to gradually short-circuit the accelerating resistors R1 and R2 until the position 5 is reached.

The action of the drum D is somewhat different during parallel motor operation from the action during series operation, by reason of the fact that the series actuating coil 13 of the limit switch L is adapted to receive the current from the armature A2 only. During series operation, the same current traverses both armatures so that the limit switch lifts to temporarily arrest the movement of the drum whenever a section of either of the resistors R1 or R2 is short circuited. The drum moves forward, therefore, one step at a time. On the other hand, during parallel motor operation, the limit switch lifts only when the current traversing the armature A2 exceeds a predetermined value. The drum thus moves forward two steps between stops, as indicated in the sequence chart, inasmuch as the current traversing the armature A1 does not influence the limit-switch coil. However, the movement of the drum between stops is not too rapid to permit the active amounts of the field windings F1 and F2 to be varied successively in drum positions 6 and 7, to thus partially reduce the rush of current as described in connection with Fig. 1. The first two parallel positions of the motors are diagrammatically illustrated in Figs. 6 and 7 of the drawings.

In order to further reduce the accelerating current during field-changing conditions, the shunt-connected coil 14 of the limit switch L is rendered inoperative by reason of the contact segment 53 of the drum D again breaking the connection between the contact fingers 54 and 55 after the drum leaves position 4. In this position, however, the magnet coil 12 of the drum is not deënergized, by reason of the interlock G—in of the switch G occupying its in position as already described.

Since the actuating coils 13 and 14 of the limit switch L are adapted, when energized, to oppositely or differentially influence the switch, it follows that, with the coil 14 excluded from the circuit, the effect of the series coil 13 will be strengthening, or, in other words, the limit switch will lift at a relatively low value of accelerating current after the drum D occupies position 5, thereby further preventing current peaks during field-changing conditions.

When the control drum D occupies its final operating position 7, the two motors are disposed in full parallel relation, with normal field strength in each motor, as diagrammatically indicated in Fig. 8 of the drawings.

The emergency operation of the line relay switch LR will now be described. If the supply-circuit voltage fails, or if, for any other reason, the switch LR drops to its lower position, the energizing circuit of the line switch LS1 is broken by reason of the interruption of the connection between the contact fingers 87. The line switch LS1 being released, breaks the holding circuit through the interlock switch LS2a by means of the interlock switch LS1b—in, thus deenergizing the coils marked 11, M2 and G, in the case of parallel motor-operation. If it is desired to operate certain of the motor-controlling switches to effect dynamic braking of the motors under emergency conditions, the auxiliary switching device or push-button PB, that is preferably located near the master controller, may be actuated by the train operator, whereupon a circuit may be completed from the actuating coil of the line switch LS1 through contact terminals 86 which are bridged by the line relay LR, train line t5, contact terminals 75 and 76, which are bridged by the push button PB, and to ground through the master reverser MR. Upon the concurrent operation of the push-button PB and the master controller MC, therefore, the actuating coils of the various motor-controlling switches, that are connected to the holding circuit closed by the interlock switch LS2a, may be energized, and the switches may be operated to set up dynamic braking through the closed motor circuit, with the line relay switch occupying its lower or emergency position, as will be understood.

I do not wish to be restricted to the specific circuit connections or arrangement of parts herein set forth, as various modifications of my invention may be made without departing from the spirit and scope thereof. I desire, therefore, that only such limitations shall be imposed as are indicated in the appended claims.

I claim as my invention:

1. In a system of control, the combination with a plurality of electric motors, a supply circuit, a line switch for joining said motors to the supply circuit, a line relay connected across said supply circuit and adapted to control the operation of said line switch, and a plurality of unit switches for controlling the operation of said motors, of means controlled by said line switch for releasing all operated unit switches in case the supply circuit be broken.

2. In a control system, the combination with a motor, a plurality of unit switches for controlling the operation of said motor, a supply circuit and a line relay connected across said supply circuit and adapted to control the operation of one of said unit switches, of means controlled by the last mentioned unit switch for releasing all operated unit switches in case the same be released.

3. In a system of control, the combination with a motor, a power-actuated controller for governing the operation of said motor, a supply circuit, a line relay connected across said supply circuit, and a line switch controlled by said line relay and adapted to join said motor to the supply circuit, of means controlled by said line switch for disconnecting the motor from the supply circuit and for returning said controller to initial position in case of interruption of the supply-circuit voltage.

4. In a system of control, the combination with a plurality of motors, a supply circuit, a line switch for connecting said motors to the supply circuit, a line relay for controlling the operation of said line switch and a plurality of unit switches for controlling the operation of said motors, of means controlled by said line switch for insuring the release of the operated unit switches in case of interruption of the supply-circuit voltage.

5. In a system of control, the combination with a supply circuit, an electric motor and a plurality of controlling devices therefor severally provided with actuating coils, of a relay device controlled by the supply circuit, a switching device controlled by said relay device adapted, in its operated position, to permit energization of certain actuating coils and adapted to assume a new position to prevent the energization of said certain coils upon an interruption of the supply-circuit voltage.

6. In a system of control, the combination with a plurality of electric motors severally having armatures and field magnet windings, a supply circuit, a line switch for joining said motors to the supply circuit, a line relay connected across said supply circuit and adapted to control the operation of said line switch, a plurality of unit switches for controlling the operation of said motors and a plurality of accelerating resistors, of means for excluding said resistors from the motor circuit in a step-by-step manner and for subsequently excluding from the circuit predetermined portions of the respective field windings in a similar manner, and means controlled by said line switch for releasing all operated unit switches in case the supply circuit be broken.

7. In a system of control, the combination with a plurality of electric motors severally having armatures and sub-divided field-magnet windings, a supply circuit, a line relay connected across said supply circuit, a line switch controlled by said line relay, a plurality of accelerating resistors, a multi-position control drum adapted to initially gradually exclude said resistors from circuit and to successively exclude predetermined portions of said field windings from circuit in subsequent positions for effecting acceleration of the motors, of means governed by the accelerating current for intermittently actuating said drum through its positions, and means controlled by said line switch for breaking the motor circuit and for returning said drum to its initial position.

8. In a system of control, the combination with a motor, a supply circuit, line switches for joining said motor to the supply circuit and a plurality of unit switches for controlling the operation of said motor, of means controlled by one of said line switches for establishing a holding circuit through any operated unit switch.

9. In a system of control, the combination with a plurality of motors, a supply circuit, line switches for connecting said motors to the supply circuit, a multi-position controller and a plurality of coils for controlling the operation of said controller, of means controlled by one of said line switches in its operated position for establishing a holding circuit through said coils and for effecting the return of the controller to initial position in case said last mentioned line switch be released.

10. In a system of control, the combination with a plurality of motors, a supply circuit, line switches for connecting said motors to the supply circuit and a plurality of unit switches each having an operating coil and a drum controller for governing the operation of said motors, of a holding circuit established by one of said line switches for the coils of said unit switch, and means for returning said drum controller to initial position and for releasing all operated unit switches in case the last mentioned line switch be released.

11. In a system of control, the combination with two motors, a unit switch for connecting the two motors in series circuit, a unit switch for grounding the first one of said motors, and a drum controller for governing the acceleration of said motors in series or in parallel-circuit relation, of means for preventing the operation of said drum to accelerate the motors unless one of said unit switches be operated.

12. In a system of control, the combination with a plurality of motors, a supply circuit, line switches and a plurality of unit switches for connecting said motors in series or in parallel-circuit relation to said supply circuit and means for effecting acceleration of the motors when connected in series or in parallel-circuit relation, of means for preventing the acceleration of said motor when connected in series circuit unless the line switches and one of said unit switches be operated and when connected in parallel circuit unless the line switches and two of said unit switches be operated.

13. In a system of control, the combination with a plurality of motors, a supply circuit, line switches and a plurality of unit switches for connecting said motors in series or in parallel-circuit relation to said supply circuit, means for effecting acceleration of the motors when connected in series or in parallel-circuit relation and a drum controller for governing the acceleration of said motors, of means for preventing the operation of said drum to effect acceleration of the motors when connected in series-circuit relation unless the line switches and one of said unit switches be operated and when connected in parallel-circuit relation unless the line switches and two of said unit switches be operated.

In testimony whereof I have hereunto subscribed my name this 29th day of Feb., 1916.

LYNN G. RILEY.

Copies of this patent may be obtained for five cents each, by addressing the "Commissioner of Patents, Washington, D. C."